Jan. 10, 1928.

H. E. ALLEN 1,655,933

LAMINATED GLASS

Filed June 26, 1926

Inventor
Horace E Allen
By Frank Fraser,
Attorney

Patented Jan. 10, 1928.

1,655,933

UNITED STATES PATENT OFFICE.

HORACE E. ALLEN, OF TOLEDO, OHIO, ASSIGNOR TO THE LIBBEY-OWENS SHEET GLASS COMPANY, OF TOLEDO, OHIO, A CORPORATION OF OHIO.

LAMINATED GLASS.

Application filed June 26, 1926. Serial No. 118,774.

The present invention relates to laminated glass, and to the process of producing the same.

An important object of the invention is to provide, as a new article of manufacture, a sheet of laminated glass and a process of producing the same, wherein a plurality of sheets of glass and a sheet of relatively non-brittle material are united.

Another object of the invention is to provide an article and process of producing the same, wherein a sheet of glass and a sheet of non-brittle material are united with the assistance of tetralin.

A further object of the invention is to provide a process wherein a sheet of glass is preferably provided with a skin of material such as a cellulose composition material, and then combining the skin to a sheet of non-brittle material such as a cellulose composition material by coating one or both of said sheets with a film of tetralin, after which the sheets may be united preferably under the action of heat and pressure.

Other objects and advantages of the invention will become apparent during the course of the following description.

Figure 1:
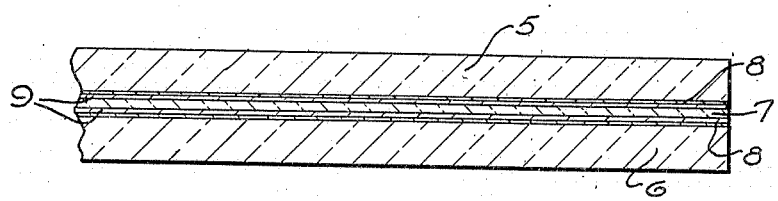
Figure 2:
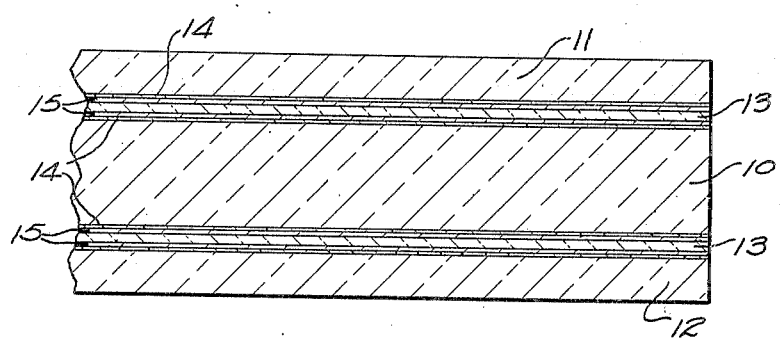

In the drawings wherein like numerals are employed to designate like parts throughout the same, Fig. 1 is a fragmentary sectional view illustrating a sheet of laminated glass formed in accordance with the present invention, and Fig. 2 is a similar view of a sheet of bullet proof glass.

In the drawings the numerals 5 and 6 designate two sheets of glass. The surfaces thereof may be ground and polished, as desired, depending particularly on the use to which the finished product is to be put. For instance, if the finished sheet is to be used as a windshield of an automobile or other vehicle, it is preferable to grind and polish at least the outer surfaces or exposed surfaces of the finished product. A sheet of laminated glass, when prepared properly, offers considerable resistance to shock and blow, and even though the glass sheets are fractured, if the union between the glass and the intervening member is proper, the greater portion, at least, of the glass will remain on said intervening member, thus preventing injury, etc.

The intervening member 7 may be any suitable relatively non-brittle material such as a cellulose composition material including cellulose nitrate, cellulose acetate, and the other products of the cellulose family. The cellulose composition materials mentioned are transparent, and form a good intervening member for a sheet of laminated glass. Of course any other substance having the same general character can be used.

To effect an efficient union or bond between the sheets of glass and the sheet of non-brittle material, one surface each of the two sheets of glass is provided with a skin 8. The skin 8 is preferably a cellulose composition material, and is preferably applied as by spraying the material in solution upon the sheets of glass. Of course the skin need not necessarily be a cellulose composition material. I consider it desirable, although not necessary, to dry the skin 8 before it is united to the non-brittle sheet 7. The non-brittle sheet 7 may or may not, as desired, be treated to form a similar skin thereon. After the skin 8 has been formed on the sheet 5, it is coated with a film 9 of tetralin or tetra-hydro-naphthalene. Tetralin is a stable water white oily liquid with a boiling point of approximately 400 degrees F., which makes it exceptionally well fitted for this particular use.

After the film of tetralin has been applied to the skin 8 and to the sheet of non-brittle material 7, if desired the laminations are united, preferably under the action of heat and pressure. This union may be accomplished by placing the laminations in a suitable press and pressed together. In this manner all excess tetralin will be squeezed out, and to prevent the trapping of tetralin between the laminations, the press used may be constructed to exert its initial pressure on the sheet centrally thereof.

In Fig. 2 is illustrated what is known in the art as bullet proof glass which comprises a central relatively heavy sheet 10 and two relatively thin outer sheets 11 and 12 respectively. Sheets of non-brittle material 13 are interposed between the three sheets of glass, while the sheets of glass are treated to form skins 14 thereon similar to the skins 8 in Fig. 1. In this type of sheet the center sheet of glass 10 will be provided with a skin on both sides thereof. Films of tetralin 15 are used in a manner similar to the production of the ordinary laminated glass above outlined.

In forming a sheet of laminated glass in accordance with this process, a finished product will be produced capable of withstanding normal temperatures without developing so-called "let-goes." The union between the skin of cellulose material and the sheet of non-brittle material will be effective and permanent.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. As a new article of manufacture, a sheet of laminated glass including a sheet of glass having a skin of material thereon which has been coated with a film of tetralin.

2. As a new article of manufacture, a sheet of laminated glass including a sheet of glass having a skin of cellulose composition material thereon which has been treated with a film of tetralin.

3. As a new article of manufacture, a sheet of laminated glass including tetralin.

4. As a new article of manufacture, a sheet of laminated glass including a film of tetralin.

5. As a new article of manufacture, a sheet of laminated glass comprising a sheet of glass, a skin thereon, a film of tetralin, and a sheet of non-brittle material.

Signed at Toledo, in the county of Lucas and State of Ohio, this 24th day of June, 1926.

HORACE E. ALLEN.